United States Patent
Koba et al.

(10) Patent No.: US 6,829,108 B2
(45) Date of Patent: Dec. 7, 2004

(54) LENS MOVING MECHANISM AND LIQUID CRYSTAL PROJECTOR

(75) Inventors: Hiroki Koba, Moriguchi (JP); Susumu Takehara, Moriguchi (JP); Kaoru Hoshide, Tokyo (JP); Minoru Kouchi, Tokyo (JP); Kentaro Eto, Tokyo (JP)

(73) Assignees: Sanyo Electric Co., Ltd., Moriguchi (JP); THK Co., Ltd., Tokyo (JP)

( * ) Notice: Subject to any disclaimer, the term of this patent is extended or adjusted under 35 U.S.C. 154(b) by 0 days.

(21) Appl. No.: 10/636,922

(22) Filed: Aug. 8, 2003

(65) Prior Publication Data

US 2004/0070851 A1 Apr. 15, 2004

(30) Foreign Application Priority Data

Aug. 12, 2002 (JP) ........................................ 2002-235088

(51) Int. Cl.$^7$ ................................................. G02B 7/02
(52) U.S. Cl. ........................ 359/813; 359/694; 359/814
(58) Field of Search ................................. 359/813, 819, 359/822, 694, 814, 823, 824, 696

(56) References Cited

U.S. PATENT DOCUMENTS

| | | | |
|---|---|---|---|
| 5,521,764 A | 5/1996 | Balogh et al. | 359/824 |
| 5,912,774 A * | 6/1999 | Yoshida et al. | 359/823 |
| 6,741,404 B2 * | 5/2004 | Ue et al. | 359/811 |

FOREIGN PATENT DOCUMENTS

| | | |
|---|---|---|
| JP | 6-331953 | 12/1994 |
| JP | 6-337394 | 12/1994 |
| JP | 9-138377 | 5/1997 |
| JP | 11-7051 | 1/1999 |

* cited by examiner

*Primary Examiner*—Gerogia Epps
*Assistant Examiner*—M. Hasan
(74) *Attorney, Agent, or Firm*—Westerman, Hattori, Daniels & Adrian, LLP

(57) ABSTRACT

The object of the present invention is to further improve a lens barrel moving mechanism of a liquid crystal projector and to provide a lens moving mechanism which has simple structure and is capable of achieving the smooth and high precision movement of a lens barrel, and a liquid crystal projector employing the lens moving mechanism.

The present invention provides a lens moving mechanism for moving a lens retaining member 20, which retains a lens barrel 15 provided therein with a projection lens for projecting light with image information, in the directions of Z axis and X axis. The lens moving mechanism comprises first and second guiding mechanisms 23, 23, 24, 24 including a track member, a movable member, and a plurality of rolling members arranged between a rolling member running surface of the track member and a rolling member running surface of the movable member, whereby the lens barrel 15 is guided by the first and the second guiding mechanisms 23, 23, 24, 24 in the directions of Z axis and X axis.

7 Claims, 17 Drawing Sheets

LENS MOVING MECHANISM AND LIQUID CRYSTAL PROJECTOR

BACKGROUND OF THE INVENTION

The present invention relates to a lens moving mechanism for retaining and moving a lens barrel of a liquid crystal projector, and to a liquid crystal projector employing the same.

FIG. 1 is an illustration showing a structural example of a conventional liquid crystal projector. In the drawing, a numeral 1 designates a light source consisting of a lamp such as a metal halide lamp, numerals 2 and 3 designate dichroic mirrors for splitting light, numerals 4 and 5 designate reflection mirrors, numerals 6, 7, and 8 designate liquid crystal panels, numerals 9 and 10 designate dichroic mirrors for recombining lights, a numeral 11 designates a light path adjusting mechanism consisting of a pair of liquid crystal prisms 12A and 12B, and a numeral 13 designates a projection lens. All of these are arranged inside a projector casing 14.

The light emitted from the light source 1 is split by dichroic mirrors 2 and 3 into lights of three primary colors, that is, red (R), blue (B), and green (G). Each of the split lights is modulated for its transmittance by the corresponding liquid crystal panel 6, 7 or 8 according to image information of each color component. The liquid crystal panels 6, 7 and 8 are located in the corresponding light paths, respectively. The modulated lights are recombined by the dichroic mirrors 9 and 10.

The recombined light is adjusted for its light path by the light path adjusting mechanism 11 and is then enlarged and projected onto a screen (not shown) through the projection lens 13.

In the aforementioned conventional liquid crystal projector, the light path adjusting mechanism 11 is arranged just before the projection lens 13. This arrangement has a problem that the miniaturization is difficult, because the light path adjusting mechanism 11 requires to lengthen the distance from the respective liquid crystal panels 6, 7 and 8 to the projection lens 13 (for instance, the distance m for the liquid crystal panel 6 in FIG. 1) in the liquid crystal projector.

There is another problem. That is, lights having image information pass multiple glass plates constituting the liquid crystal prisms 12A and 12B of the light path adjusting mechanism 11 after transmitted through the liquid crystal panels 6, 7 and 8 and are then projected through the projection lens 13 so that the image is enlarged and displayed on the screen. Due to the multiple glass plates, the image distortion and chromatic aberration distortion in the image projected on the screen are increased, thus making high resolution image display impossible.

In order to solve the problem of difficulty in miniaturization and the problem that it is impossible to display a high resolution image due to increase of image distortion and chromatic aberration distortion in the projected image, for example, Japanese Unexamined Patent Publication No. H6-331953 discloses a liquid crystal projector constructed in such a manner that a lens barrel moving mechanism is provided which can move the lens barrel having the projection lens therein relative to the projector casing in a direction perpendicular to the projector casing, thus eliminating the light path adjusting mechanism which is the factor causing the difficulties in miniaturization, and in high resolution image display due to enhancement of image distortion and chromatic aberration distortion.

By structuring a liquid crystal projector in this manner, the miniaturization can be achieved, and it becomes possible as well to perform the shift- or tilt adjustment of the projected image without generation of image distortion and chromatic aberration distortion in the projected image.

SUMMARY OF THE INVENTION

It is an object of the present invention to further improve the above-described lens barrel moving mechanism of a liquid crystal projector in which the light path adjusting mechanism is eliminated, and to provide a lens moving mechanism which has a simple structure and is capable of achieving a smooth and precise movement of the lens barrel, and a liquid crystal projector employing the lens moving mechanism.

In order to achieve the foregoing object, a first invention of the present application provides a lens moving mechanism comprising: a lens retaining member for retaining a lens barrel which is provided therein with a projection lens for projecting light with the image information; a lens retaining member guiding means for guiding said lens retaining member movably in at least one direction of axis which is perpendicular to the optical axis of said light; a fixed supporting member for supporting said lens retaining member guiding means; and a driving means for applying a driving force to the lens barrel, wherein said lens retaining member guiding means comprises: a track member which is provided with a rolling member running surface extending along the longitudinal direction thereof; a movable member which is incorporated in said track member such that the movable member is movable relative to said track member and is provided with a rolling member running surface corresponding to the rolling member running surface of said track member; and a plurality of rolling members arranged between the rolling member running surface of said track member and the rolling member running surface of said movable member.

Since the lens retaining member guiding means has the aforementioned structure, that is, comprising a track member which is provided with a rolling member running surface extending along the longitudinal direction thereof, a movable member which is incorporated in the track member such that the movable member is movable relative to the track member and is provided with a rolling member running surface corresponding to the rolling member running surface of the track member, and a plurality of rolling members arranged between the rolling member running surface of the track member and the rolling member running surface of the movable member, the relative movement of the movable member to the track member is smooth because of the rolling members, thus achieving the smooth movement of the projection lens.

A second invention of the present application provides the aforementioned lens moving mechanism being characterized by further comprising an intermediate member for interconnecting said lens retaining member and said fixed supporting member, wherein said lens retaining member guiding means comprises a first guiding means arranged between said fixed supporting member and said intermediate member and a second guiding means arranged between said intermediate member and the lens retaining member, said first guiding means guides said intermediate member in a first predetermined direction, and said second guiding means guides said lens retaining member in a second predetermined direction perpendicular to said first predetermined direction, and the respective track members and the respective movable members of said first guiding means and said second guiding means are arranged at substantially the same position relative to the direction of the optical axis.

Since the respective track members and the respective movable members of the first guiding means and the second guiding means are arranged at substantially the same position relative to the direction of the optical axis as described above, the lens moving mechanism can be structured to have reduced thickness in the direction of the optical axis, thus enabling a miniaturization.

A third invention of the present application provides the aforementioned lens moving mechanism being characterized in that the track members and the movable members of the lens retaining member guiding means are arranged in such a manner that their transverse directions are substantially parallel to the direction of the optical axis.

Since the track members and the movable members of the lens retaining member guiding means are arranged in such a manner that their transverse directions are substantially parallel to the direction of the optical axis, the rigidity against the moment in the direction perpendicular to the optical axis is increased so that the heavy lens barrel can be supported with high rigidity, thereby enabling the precise and smooth movement of the lens barrel.

A fourth invention of the present application provides the aforementioned lens moving mechanism being characterized in that an interference is set between the rolling members and the rolling member running surfaces of the track member and the movable member in said lens retaining member guiding means.

By setting an interference (a minus clearance) between the rolling members and the rolling member running surfaces of the track member and the movable member in the lens retaining member guiding means as described above, the rigidity of the lens retaining member guiding means is increased, enabling a more precise and smoother movement of the heavy lens barrel.

A fifth invention of the present application provides the aforementioned lens moving mechanism being characterized in that said track member is an outer rail which is made of a plate member and substantially formed in a U-shape in a section perpendicular to the longitudinal direction thereof and to have the rolling member running surfaces on both inner sides in the transverse direction thereof, and said movable member is an inner rail which is made of a plate member and substantially formed in a U-shape in a section perpendicular to the longitudinal direction thereof and to have the rolling member running surfaces on both outer sides in the transverse direction thereof, and said lens moving mechanism further comprising a rolling member retainer which retains rotatably said rolling members.

Since the track member and the movable member are an outer rail and an inner rail made of plate members, the track member and the movable member can be formed easily by, for instance, pressing of steel sheets and inexpensive commercially available balls can be used for the rolling members. As a result, the mechanism can be fabricated at relatively low cost, achieving the cost reduction.

A sixth invention of the present application provides aforesaid lens moving mechanism being characterized in that said track member is a track rail provided with the rolling member running surfaces on both sides in the transverse direction thereof, and said movable member is a movable block provided with endless circulation passages including the rolling member running surfaces corresponding to the rolling member running surfaces of said track rail, and said rolling members are accommodated to be aligned in said endless circulation passages to circulate according to the relative movement of said movable block to said track rail.

In the structure that the track member is a track rail provided with the rolling member running surfaces on both sides in the transverse direction thereof, and the movable member is a movable block provided with endless circulation passages including the rolling member running surfaces corresponding to the rolling member running surfaces of the track rail, and the rolling members are accommodated to be aligned in the endless circulation passages to circulate according to the relative movement of the movable block to the track rail, an extremely smooth operation, that is, an extremely smooth relative movement of the movable block to the track rail can be achieved. Therefore, it is possible to smoothly move the lens barrel. In addition, since the lens retaining member guiding means composed of the track rail and the movable block has a high rigidity, the lens barrel can be supported rigidly and the lens barrel can be moved with higher precision.

A seventh invention of the present application provides a liquid crystal projector characterized by comprising a lens moving mechanism as claimed in any one of claims 1 through 6, and a projector casing which is provided therein with liquid crystal panels, wherein lights with image information from said liquid crystal panels are introduced to the projection lens retained by said lens moving mechanism.

The liquid crystal projector comprises the aforementioned lens moving mechanism, thereby achieving a compact liquid crystal projector without generation of the image distortion and the chromatic aberration distortion in the projected image.

BRIEF DESCRIPTION OF THE DRAWINGS

FIGS. 7(A), 7(B) are illustrations showing a structure of a first guiding mechanism, in which FIG. 7(A) is a partially cutaway perspective view thereof and FIG. 7(B) is a sectional view taken along the line C—C of FIG. 7(A);

FIGS. 11(A), 11(B) are illustrations showing a structural example of a driving mechanism of the first guiding mechanism, in which FIG. 11(A) is a bottom view thereof and FIG. 11(B) is a front view thereof;

DESCRIPTION OF THE PREFERRED EMBODIMENT

Figure 2:
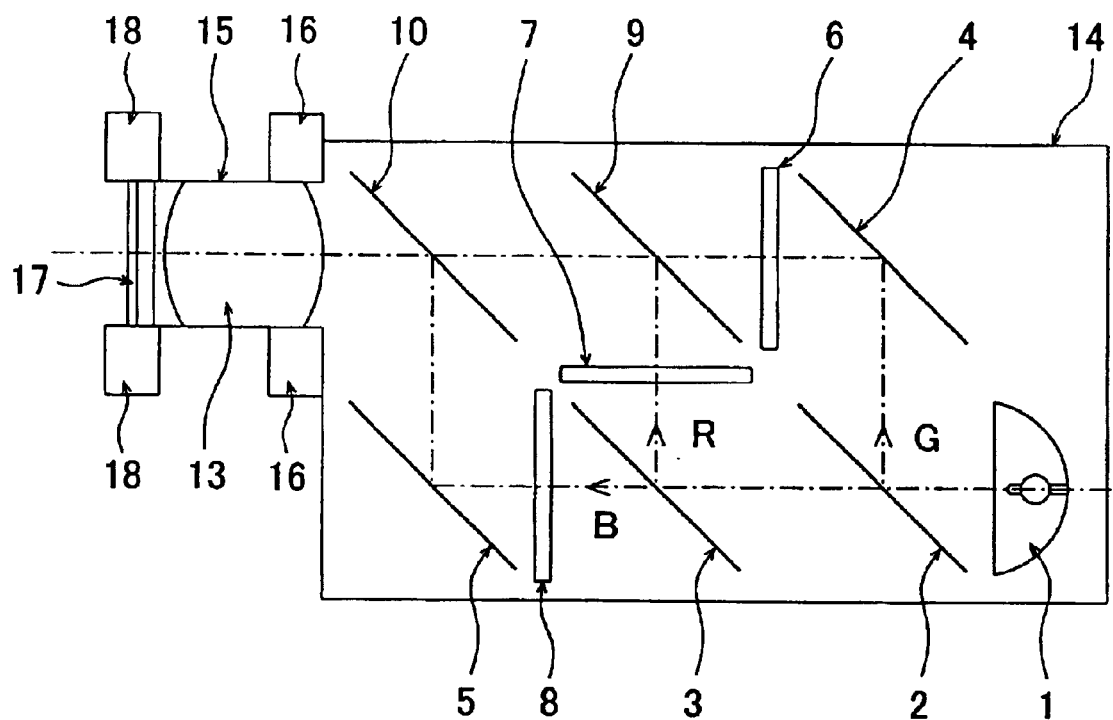
FIG. 2 is an illustration showing a structural example of a liquid crystal projector employing a lens moving mechanism in accordance with the present invention.

Hereinafter, embodiments of the present invention will be described with reference to the attached drawings. FIG. 2 is an illustration showing a structural example of a first embodiment of a liquid crystal projector employing a lens moving mechanism in accordance with the present invention.

Figure 1:
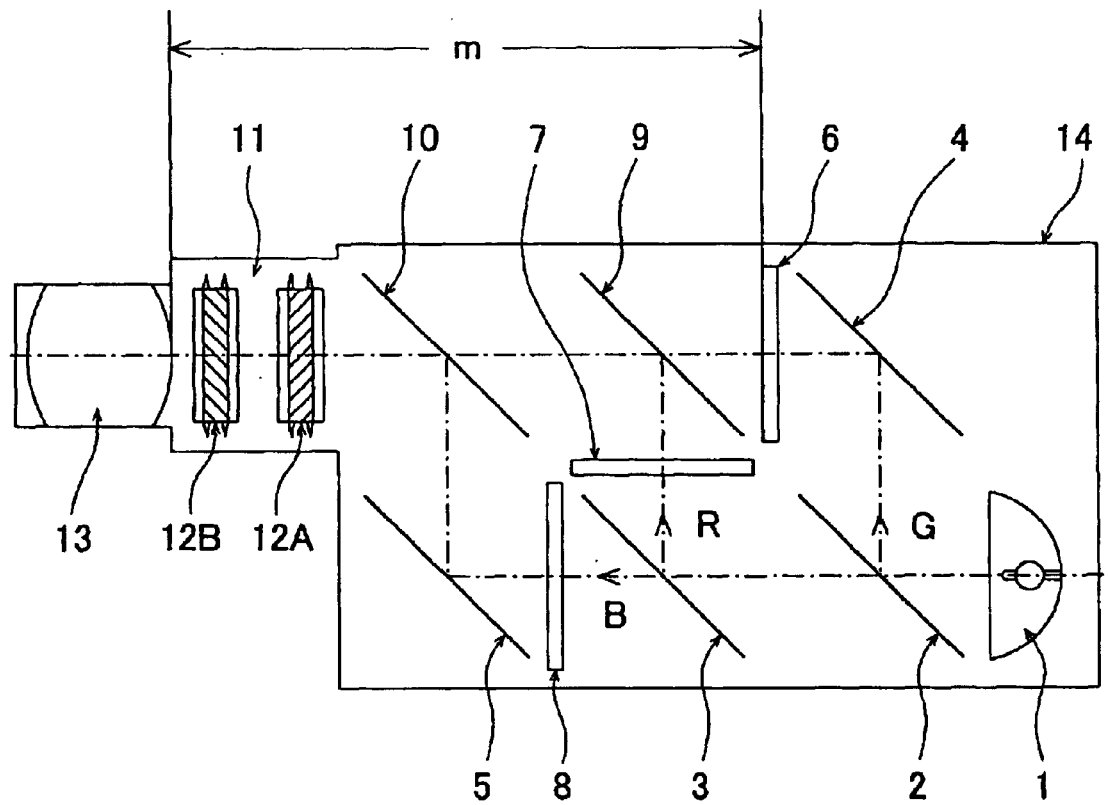
FIG. 1 is an illustration showing a structural example of a conventional liquid crystal projector.

In FIG. 2, components marked with the same reference numerals as used in FIG. 1 are identical or corresponding components.

A liquid crystal projector comprises a lens barrel moving mechanism 16 which is arranged outside of the lens barrel 15 accommodating a projection lens 13, for moving the lens barrel 15 in the horizontal direction (the direction of X axis) and in the vertical direction (the direction of Z axis) relative to the projector casing 14, the structure of the mechanism being described later in detail.

In the lens barrel 15, a glass plate 17 is arranged at the emitting side of the projection lens 13 in such a manner as to cover the emitting end of the lens barrel 15.

Outside of the lens barrel 15 is provided with a glass plate rotating mechanism 18 which can rotate the glass plate 17 about a first rotating axis extending in the horizontal direction (the direction of X axis) and about a second rotating axis extending in the vertical direction (the direction of Z axis).

Figure 3:
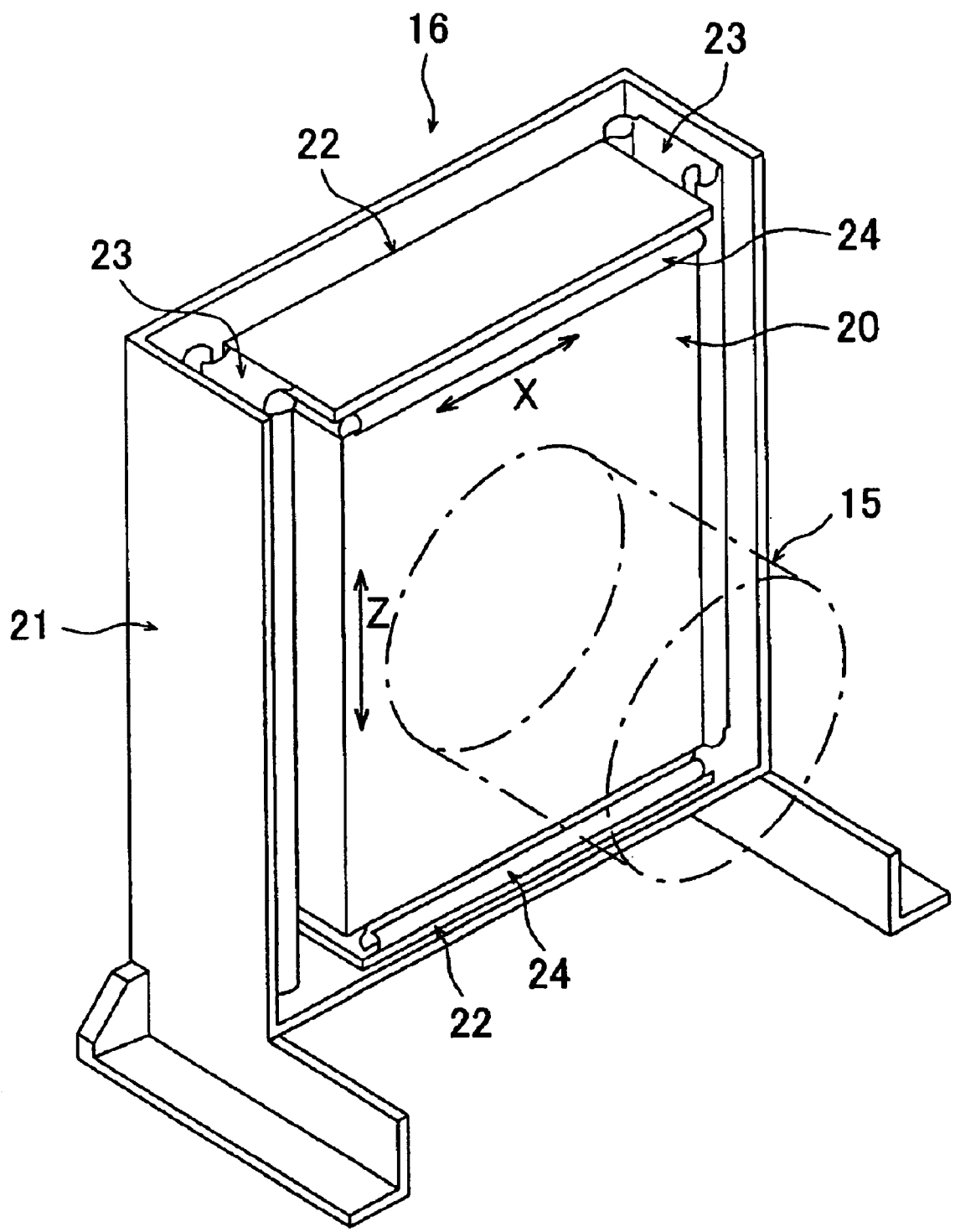
FIG. 3 is a schematic perspective view showing a structural example of a lens barrel moving mechanism (the first embodiment) of the lens moving mechanism in accordance with the present invention.
Figure 4:
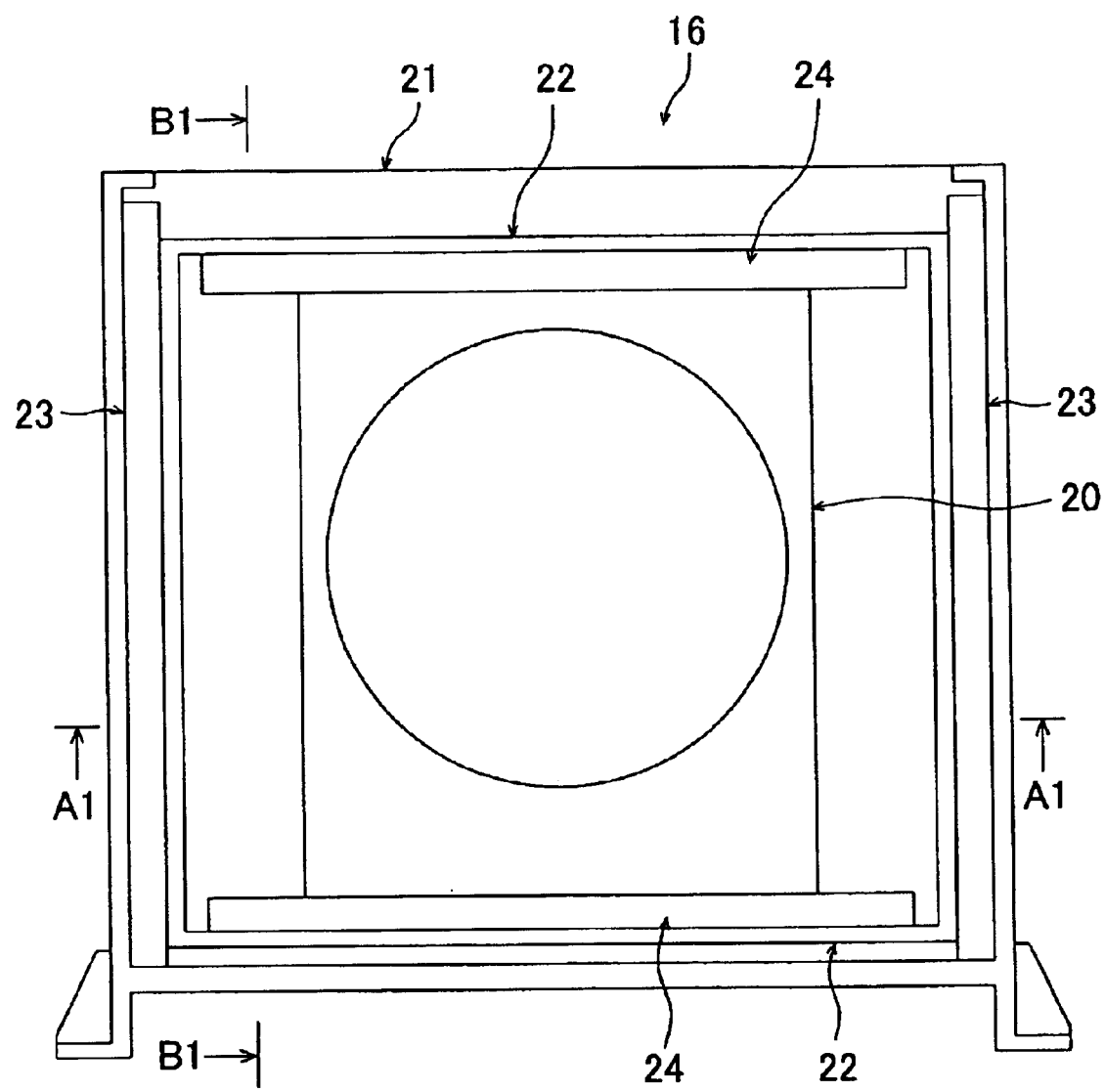
FIG. 4 is a front view of a structural example of the lens barrel moving mechanism (the first embodiment) of the lens moving mechanism in accordance with the present invention.
Figure 5:
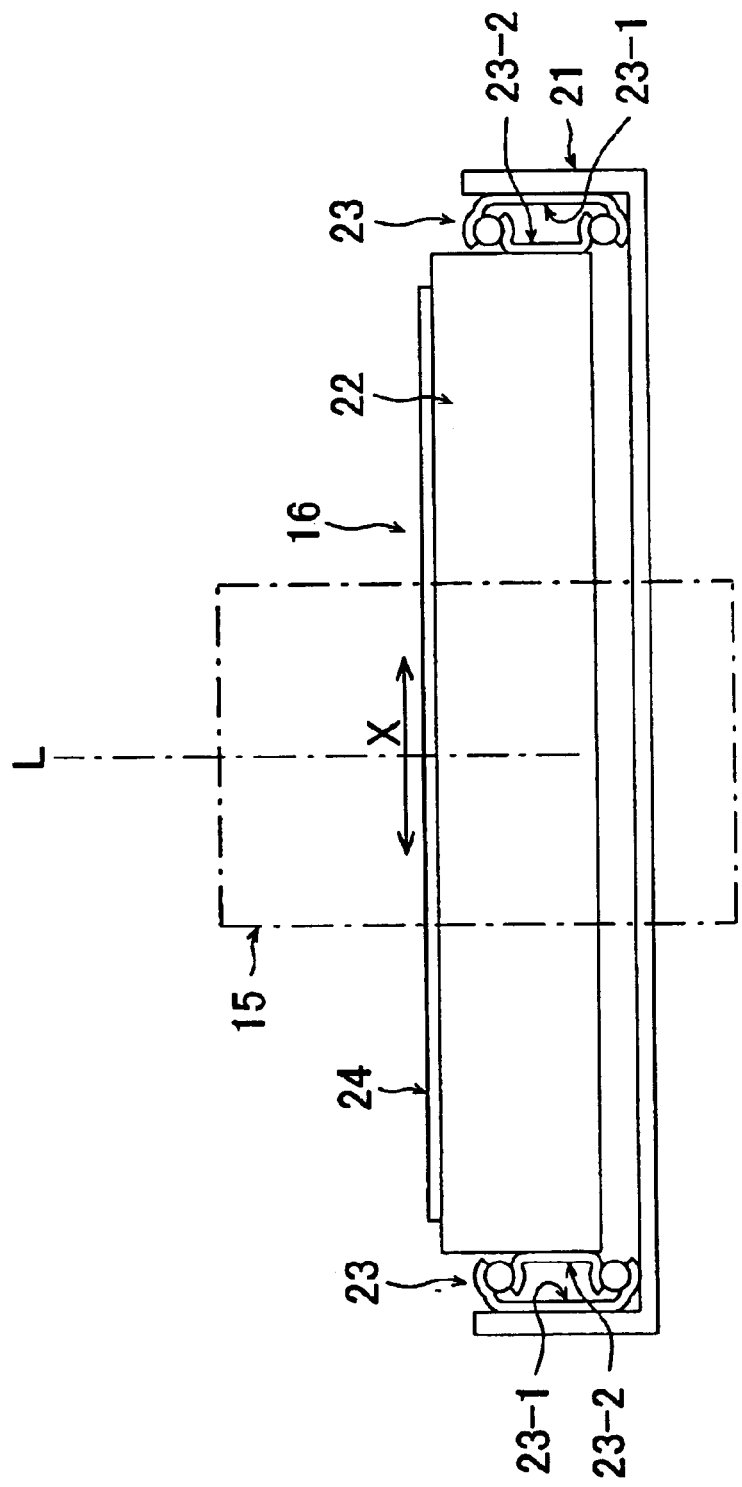
FIG. 5 is a sectional view taken along the line A1—A1 in FIG. 4.
Figure 6:
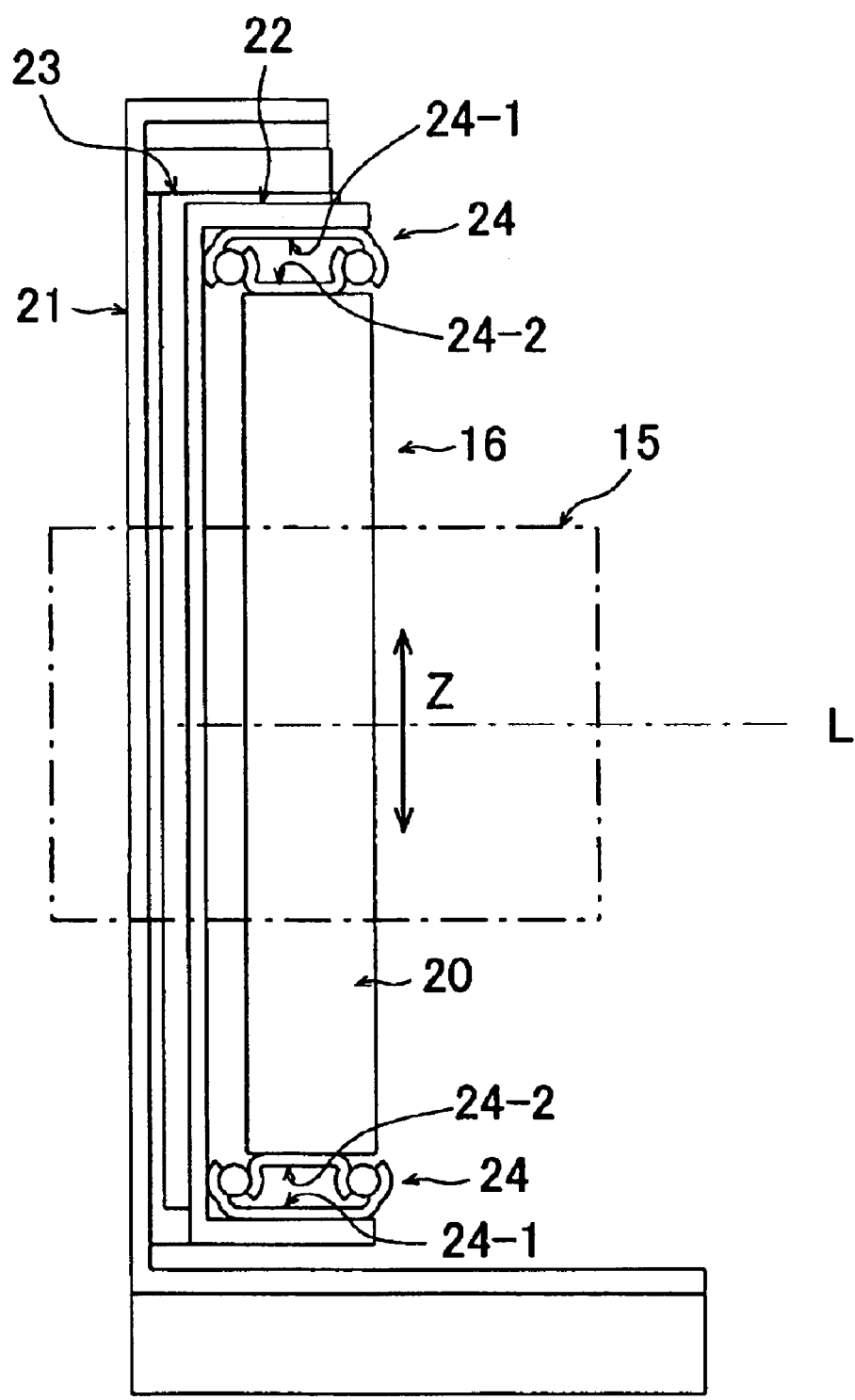
FIG. 6 is a sectional view taken along the line B1—B1 in FIG. 4.

FIGS. 3 through 6 are illustrations showing a structural example of the aforementioned lens barrel moving mechanism 16, in which FIG. 3 is a schematic perspective view thereof, FIG. 4 is a front view thereof, FIG. 5 is a sectional view taken along the line A1—A1 in FIG. 4, and FIG. 6 is a sectional view taken along the line B1—B1 in FIG. 4.

The lens barrel moving mechanism 16 comprises a lens retaining member 20 retaining the lens barrel 15, a fixed supporting member 21, an intermediate member 22 interconnecting the lens retaining member 20 and the fixed supporting member 21, and a lens retaining member guiding mechanism which moves the lens retaining member 20 in the vertical direction (the direction of Z axis) and in the horizontal direction (the direction of X axis).

The lens retaining member guiding mechanism comprises first guiding mechanisms 23, 23 arranged between the fixed supporting member 21 and the intermediate member 22, and second guiding mechanisms 24, 24 arranged between the intermediate member 22 and the lens retaining member 20. Both guiding mechanisms will be described later in detail.

Figure 7:
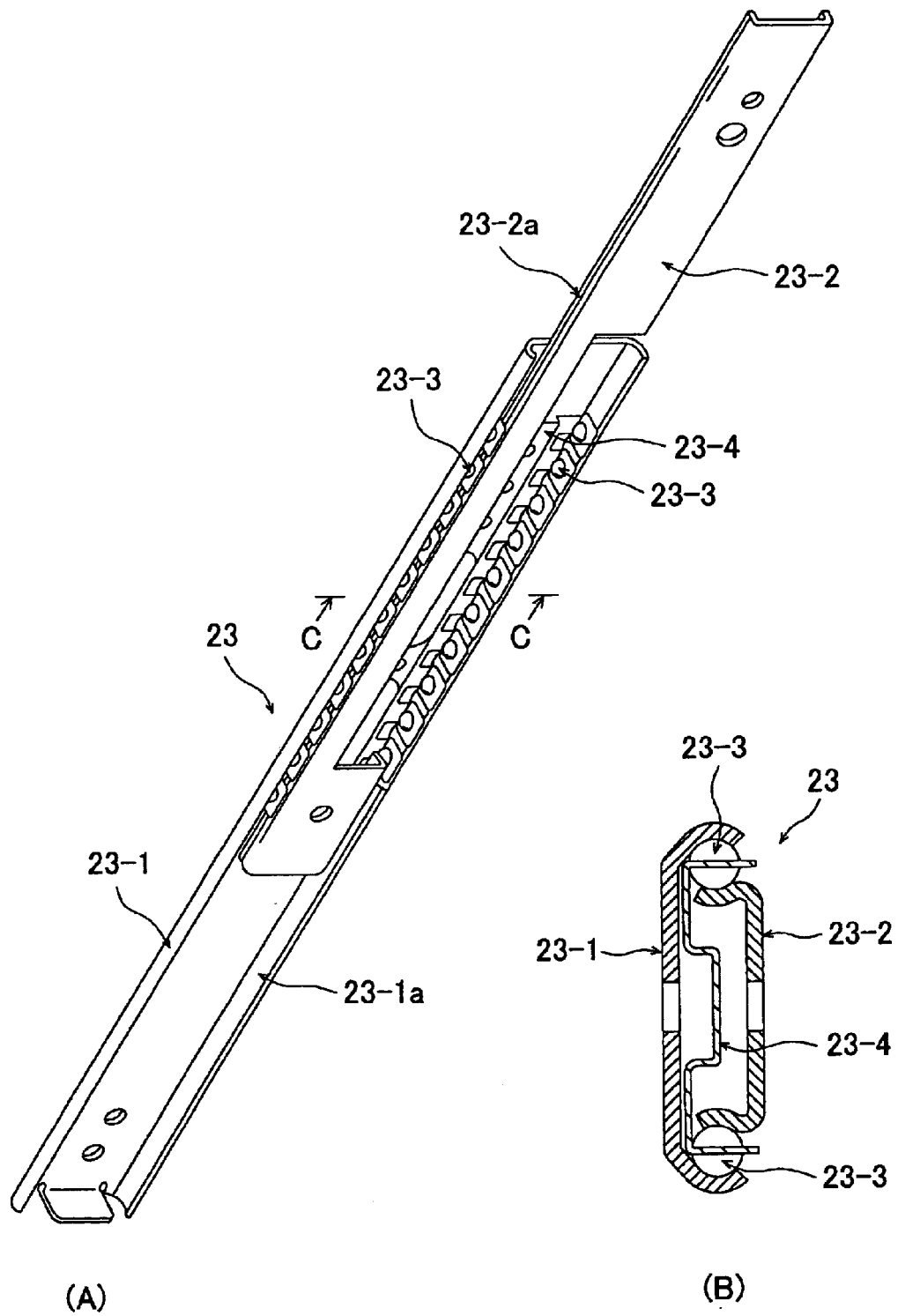

FIGS. 7(A), 7(B) are illustrations showing the structure of one of the first guiding mechanism 23, in which FIG. 7(A) is a partially cutaway perspective view thereof and FIG. 7(B) is a sectional view taken along the line C—C. In FIGS. 7(A), 7(B), a numeral 23-1 designates an outer rail as a track member, a numeral 23-2 designates an inner rail which is received in and combined with the outer rail 23-1 in such a manner that the inner rail 23-2 is slidable relative to the outer rail 23-1, a numeral 23-3 designates balls as rolling members which roll between the outer rail 23-1 and the inner rail 23-2, and a numeral 23-4 designates a retainer as a ball retainer for aligning and retaining multiple balls 23-3 with predetermined intervals, between the outer rail 23-1 and the inner rail 23-2.

The outer rail 23-1 is made of a plate member to be formed substantially in a U-shape in a section perpendicular to the longitudinal direction, and is provided on both transversely inner sides with rolling member running surfaces 23-1a extending along the longitudinal direction.

The inner rail 23-2 is made of a plate member to be formed substantially in a U-shape in a section perpendicular to the longitudinal direction, and is provided on both transversely outer sides with rolling member running surfaces 23-2a extending along longitudinal direction.

The rolling member running surfaces 23-1a of the outer rail 23-1 and the rolling member running surfaces 23-2a of the inner rail 23-2 cooperate together to accommodate the multiple balls 23-3 which are rotatably retained by means of the retainers 23-4.

Further, a second guiding mechanism 24 has the same structure as that of the first guiding mechanism 23, that is, comprising an outer rail 24-1, an inner rail 24-2, balls 24-3, and a retainer 24-4. The illustration is omitted.

The outer rails 23-1, 23-1 of the first guiding mechanisms 23, 23 are fixed to both inner sides, in the horizontal direction (the direction of X axis), of the fixed supporting member 21, and the inner rails 23-2, 23-2 are fixed to both ends, in the horizontal direction, of the intermediate members 22, as shown in FIG. 5.

Further, the outer rails 24-1, 24-1 of the second guiding mechanisms 24, 24 are fixed to the respective inner sides, in the vertical direction (the direction of Z axis), of the intermediate members 22, 22, and the inner rails 24-2, 24-2 are fixed to outer sides, in the vertical direction, of the lens retaining member 20, as shown in FIG. 6.

By moving the inner rails 23-2, 23-2 of the first guiding mechanisms 23, 23 relative to the outer rails 23-1, 23-1 vertically by means of a driving mechanism as will be later described in detail, the lens retaining member 20 is moved vertically, that is, the lens barrel 15 is moved vertically.

By moving the inner rails 24-2, 24-2 of the second guiding mechanisms 24, 24 relative to the outer rails 24-1, 24-1 horizontally by means of a driving mechanism (not shown), the lens retaining member 20 is moved horizontally, that is, the lens barrel 15 is moved horizontally.

According to the aforementioned structure that the lens retaining member guiding mechanism comprises the first guiding mechanisms 23, 23 comprising the outer rails 23-1 and the inner rails 23-2 for guiding the lens retaining member 20 vertically, and the second guiding mechanisms 24, 24 comprising the outer rails 24-1 and the inner rails 24-2 for guiding the lens retaining member 20 horizontally, the movement of the inner rails 23-2, 23-2 relative to the outer rails 23-1, 23-1 of the first guiding mechanisms 23, 23 can be performed smoothly by balls 23-3, 23-3. Similarly, the movement of inner rails 24-2, 24-2 relative to the outer rails 24-1, 24-1 of the second guiding mechanisms 24, 24 can be performed smoothly by balls 24-3, 24-3. As a result, the lens barrel 15 can be moved smoothly.

Since the outer rails 23-1, 24-1 and inner rails 23-2, 24-2 can be formed easily by, for instance, pressing of steel sheets and inexpensive commercially available balls can be used for the balls, the guiding mechanisms can be fabricated at relatively low cost, thereby achieving the cost reduction.

Further, the outer rails 23-1, 23-1, 24-1, 24-1 and inner rails 23-2, 23-2, 24-2, 24-2 of the first guiding mechanisms 23, 23 and the second guiding mechanisms 24, 24, respectively, are arranged at substantially the same position relative to the direction of the optical axis L.

Therefore, the lens barrel moving mechanism 16 can be structured with reduced thickness in the direction of the optical axis L, achieving the miniaturization.

In addition, the outer rails 23-1, 23-1, 24-1, 24-1 and inner rails 23-2, 23-2, 24-2, 24-2 of the first guiding mechanisms 23, 23 and the second guiding mechanisms 24, 24 are arranged in such a manner that their transverse directions are substantially parallel to the direction of the optical axis L.

This structure increases the rigidity against the moment in the direction perpendicular to the optical axis L. Thus, the heavy lens barrel 15 can be supported with high rigidity, thereby ensuring a precise and smooth movement of the lens barrel 15.

In addition, an interference (minus clearance) is set between the balls 23-3 and the rolling member running surfaces of the outer rail 23-1 and the inner rail 23-2 of the first guiding mechanism 23, and between the balls 24-3 and the rolling member running surfaces of the outer rail 24-1 and the inner rail 24-2 of the second guiding mechanism 24.

This structure increases the rigidity of the first guiding mechanism 23 and the second guiding mechanism 24, thereby ensuring a more precise and smooth movement of the heavy lens barrel 15.

Figure 8:
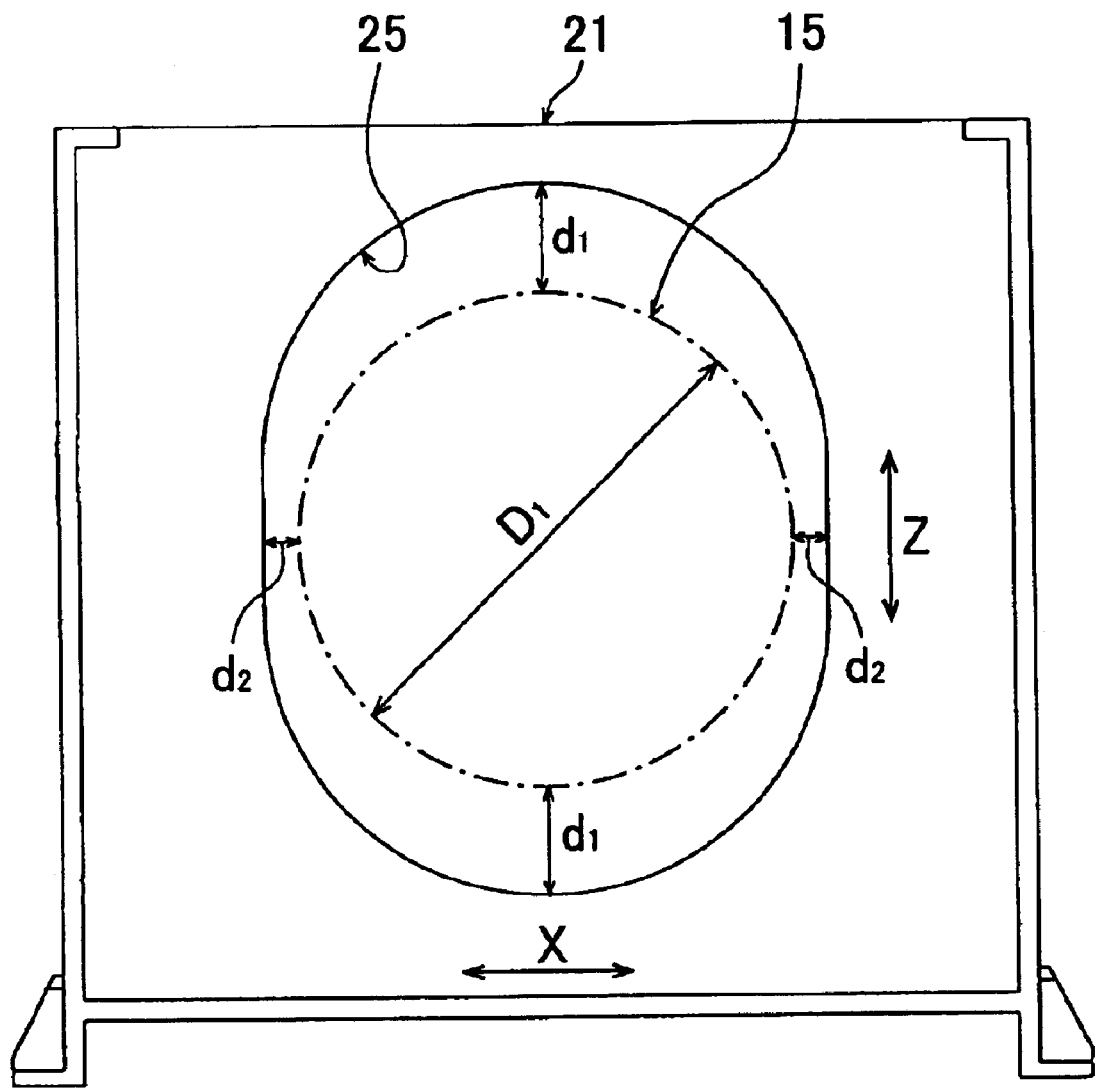
FIG. 8 is a front view of a fixed supporting member of the lens barrel moving mechanism.

FIG. 8 is a front view of the fixed supporting member 21 of the lens barrel moving mechanism 16. In the drawing, the fixed supporting member 21 is a plate member provided at the center part with a through hole 25 for receiving the lens barrel 15, the hole being an elongated hole having larger diameter in the vertical direction (the direction of Z axis).

The through hole 25 has a diameter in the vertical direction (the direction of Z axis) which is larger than the diameter $D_1$ of the lens barrel 15 by $2d_1$, and a diameter in the horizontal direction (the direction of X axis) which is larger than the diameter $D_1$ of the lens barrel 15 by $2d_2$ ($d_1 > d_2$), thus allowing the lens barrel 15 to loosely fit in the hole 25 with a margin.

Figure 9:
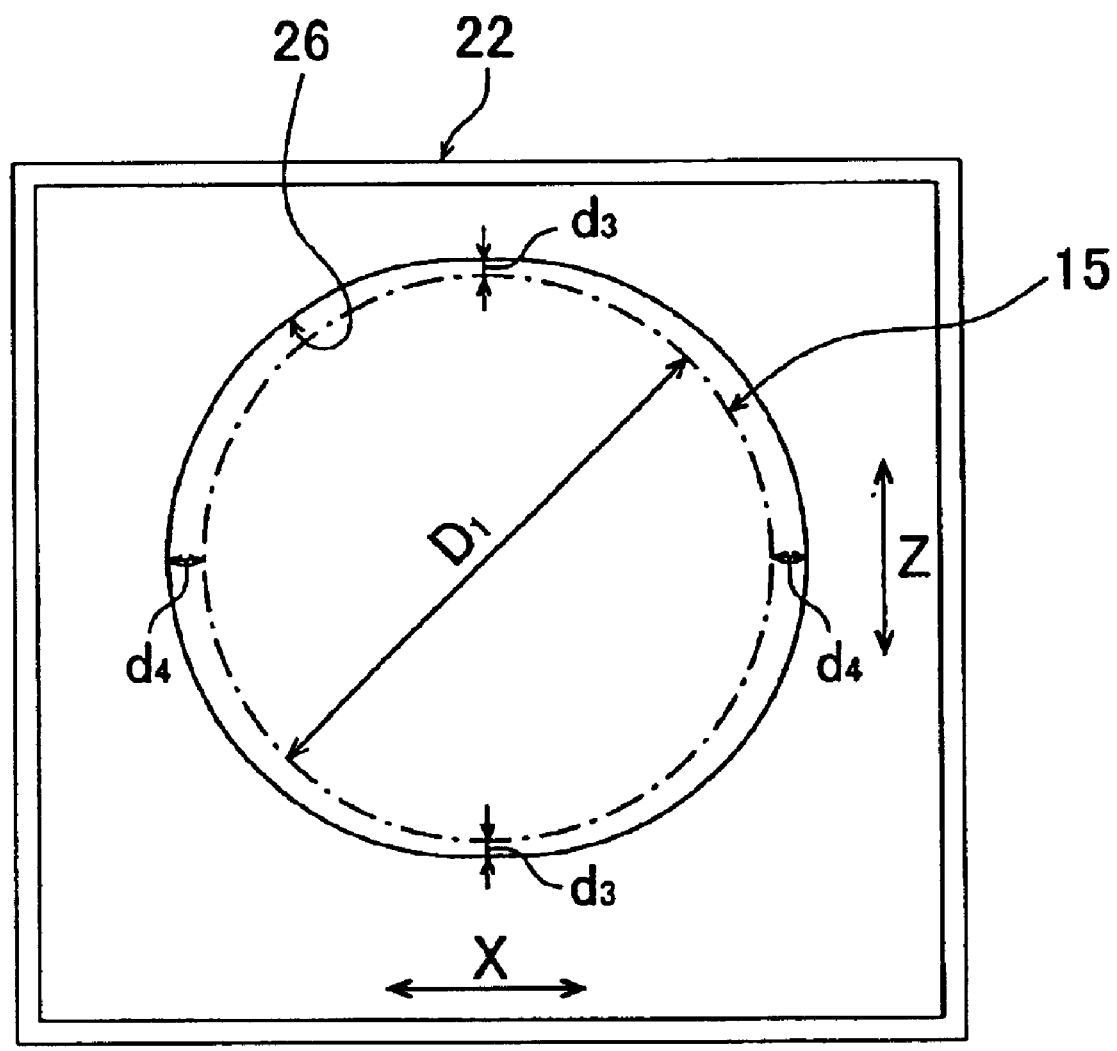
FIG. 9 is a front view of an intermediate member of the lens barrel moving mechanism.

FIG. 9 is a front view of the intermediate member 22 of the lens barrel moving mechanism 16. In the drawing, the intermediate member 22 is a plate member provided at the center part with a through hole 26 for receiving the lens barrel 15, the hole being an elongated hole having larger diameter in the horizontal direction (the direction of X axis).

The hole 26 has a diameter in the horizontal direction (the direction of X axis) which is larger than the diameter $D_1$ of the lens barrel 15 by $2d_4$, and a diameter in the vertical direction (the direction of Z axis) which is larger than the diameter $D_1$ of the lens barrel 15 by $2d_3$ ($d_4 > d_3$), thus allowing the lens barrel 15 to loosely fit in the hole 26. Here, $d_2$ $d_4$.

Figure 10:
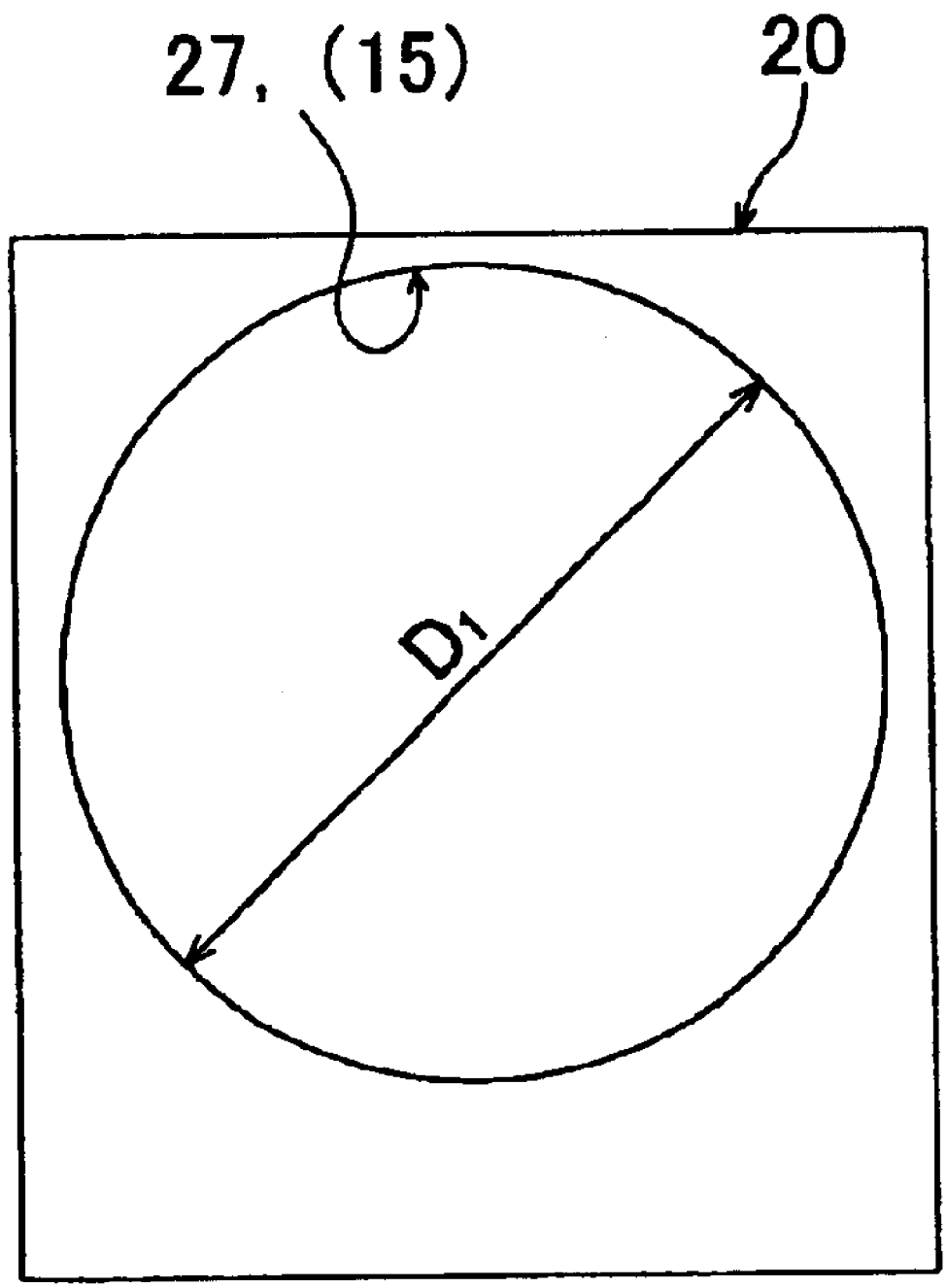
FIG. 10 is a front view of a lens retaining member of the lens barrel moving mechanism.

FIG. 10 is a front view of the lens retaining member 20 of the lens barrel moving mechanism 16. In the drawing, the lens retaining member 20 is a plate member provided at the center part with a circular through hole 27 for receiving the lens barrel 15. The diameter of the hole 27 is substantially equal to the diameter $D_1$ of the lens barrel 15, thus allowing the lens barrel 15 to tightly fit into the hole 27.

By setting the diameters of the through holes 25, 26, and 27 of the fixed supporting member 21, the intermediate member 22, and the lens retaining member 20 in the aforementioned manner, the intermediate member 22 can move relative to the fixed supporting member 21 in the vertical direction within a range of $d_1$, and the lens retaining member 20 with the lens barrel 15 tightly fitting in the through hole 27 thereof can move relative to the intermediate member 22 in the horizontal direction within a range of $d_4$.

As a result, the lens barrel 15 in which the projection lens 13 is arranged can move in the vertical direction within a range of $d_1$ and in the horizontal direction within a range of $d_4$, thus enabling a shift adjustment of the projected position of the projected image.

Figure 11:
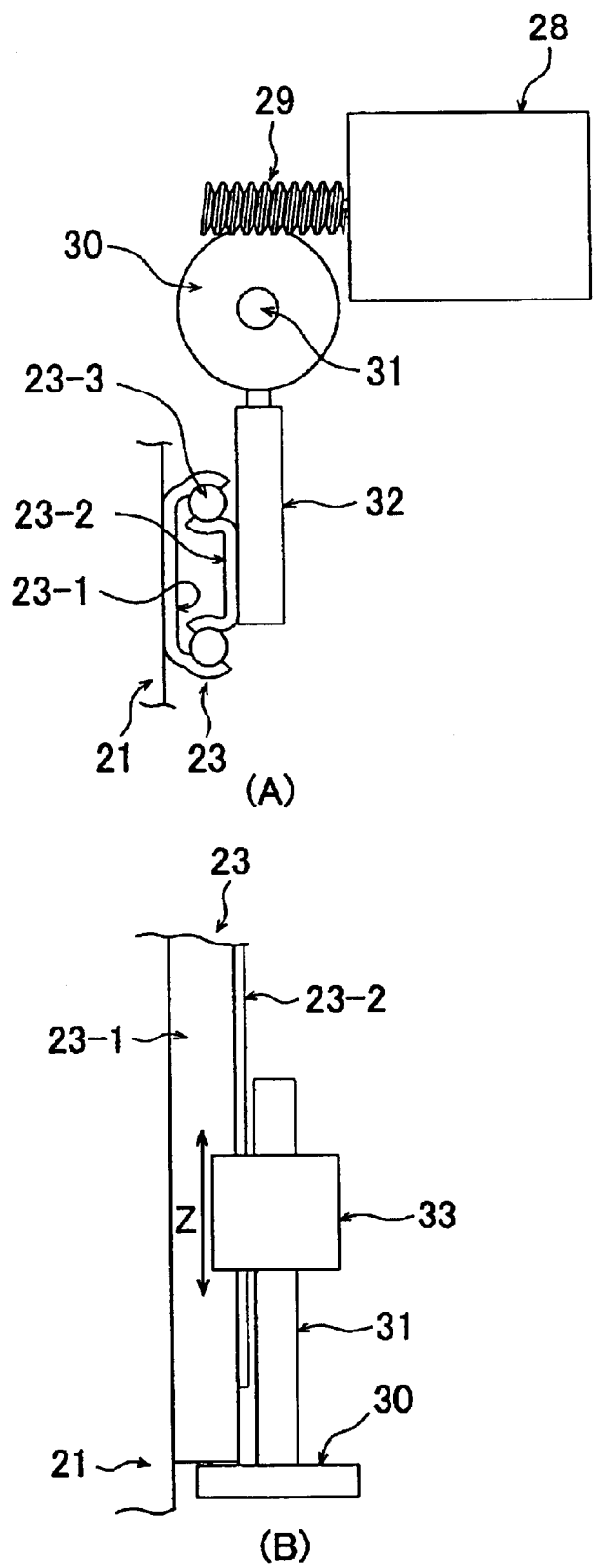

FIGS. 11(A), 11(B) are illustrations showing a structural example of a driving mechanism for applying a driving force to the inner rail 23-2 of the first guiding mechanism 23, in which FIG. 11(A) is a bottom view thereof, and FIG. 11(B) is a front view thereof (excluding a motor and a worm).

The driving mechanism comprises a motor 28, a worm 29 connected to a rotating shaft of the motor 28, a worm wheel 30 meshed with the worm 29, a threaded shaft 31 connected to the worm wheel 30, a nut 33 engaging with the threaded shaft 31, and a connecting member 32 connecting the nut 33 and the inner rail 23-2.

In the driving mechanism having the aforementioned structure, the rotation (normal rotation or reverse rotation) of the motor 28 rotates the warm wheel 30 and the threaded shaft 31 via the worm 29. The rotation of the threaded shaft 31 moves the nut 33 in the vertical direction (the direction of Z axis), in turn moving the inner rail 23-2 connected to the nut 33 via the connecting member 32 in the vertical direction (the direction of Z axis).

In addition, a driving mechanism which is not shown for applying driving force to the inner rail 24-2 of the second guiding mechanism 24 has a similar structure as the mentioned above.

In the example described above, the lens barrel 15 is moved along two axes, that is, in the horizontal direction (the direction of X axis) and in the vertical direction (the direction of Z axis) by means of the first and the second guiding mechanisms 23, 24. However, the lens barrel may be structured to be moved only in either one direction (the direction of X axis or Z axis).

In addition, in the example described above, the balls 23-3, 24-3 are used as the rolling members in the first and the second guiding mechanisms 23, 24. However, it should be understood that the rolling members for the guiding mechanism are not limited to the balls, but also cylindrical rollers may be used, for example.

Further, in the example described above, the outer rails 23-1, 24-1 are fixed parts and inner rails 23-2, 24-2 are movable parts in the first and the second guiding mechanisms 23, 24. However, it should be understood that the inner rails 23-2, 24-2 may be fixed parts and the outer rails 23-1, 24-1 may be movable parts.

Figure 12:
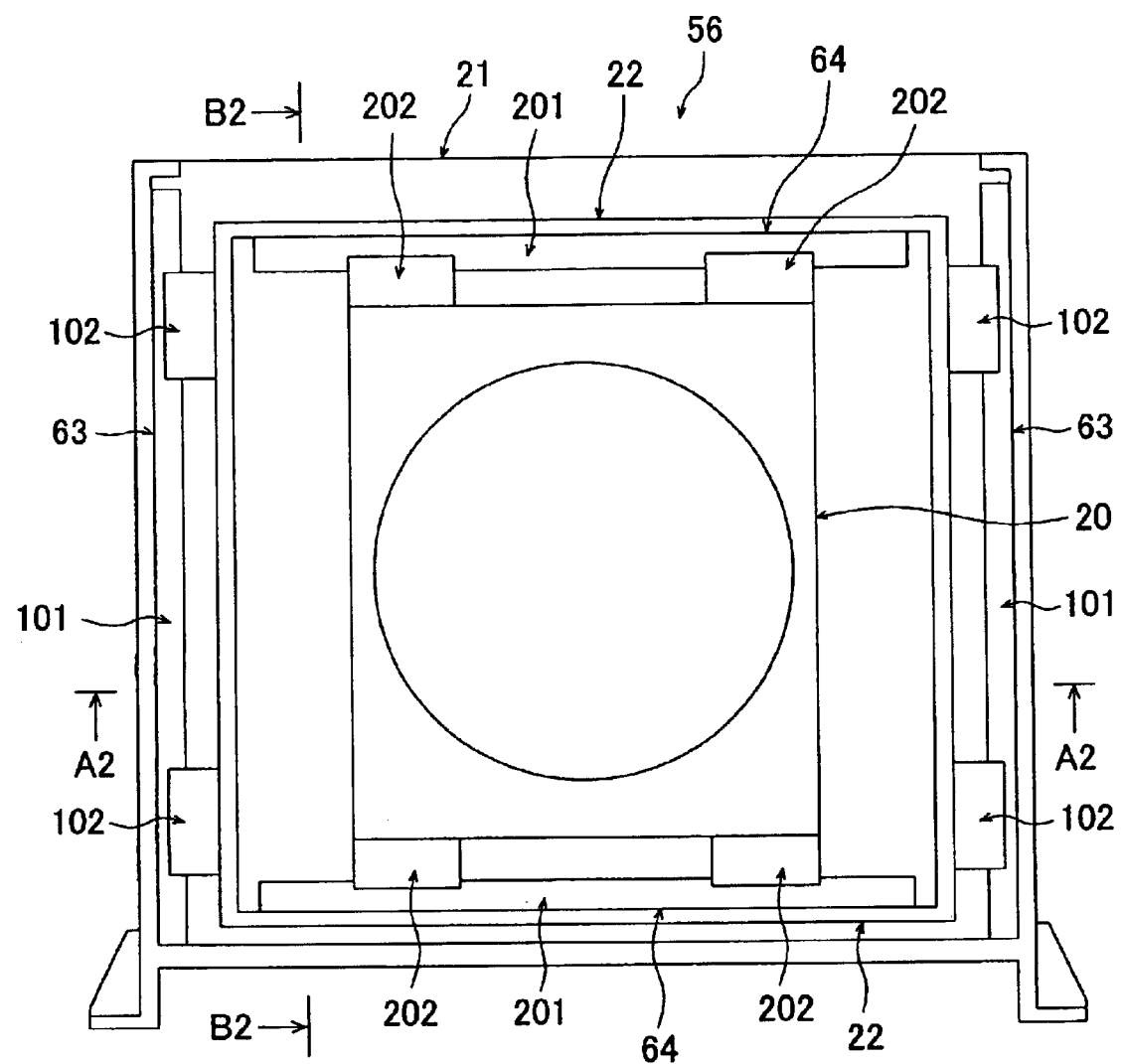
FIG. 12 is a front view showing a structural example of a lens barrel moving mechanism (the second embodiment) of the lens moving mechanism in accordance with the present invention.
Figure 13:
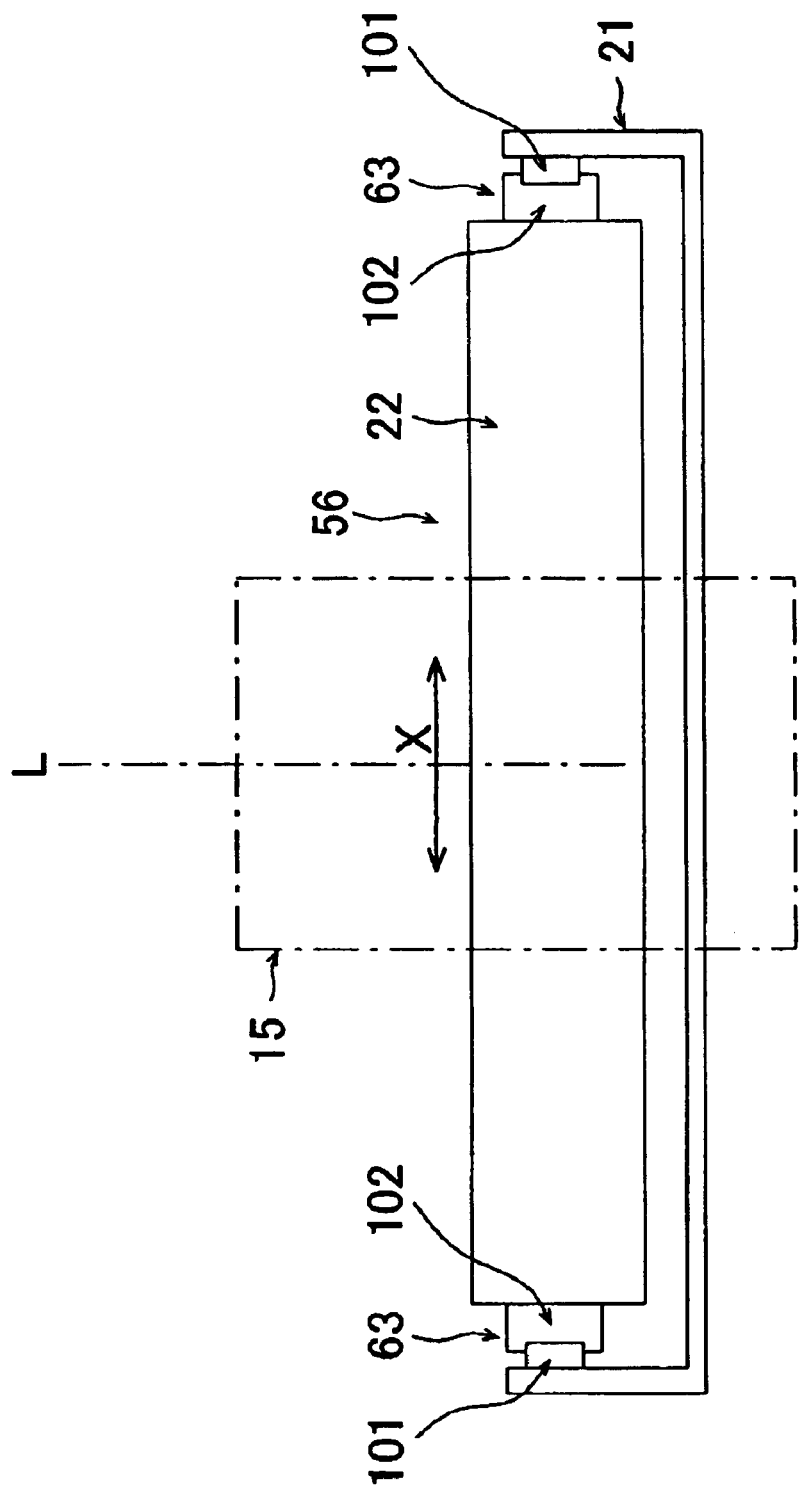
FIG. 13 is a sectional view taken along the line A2—A2 in FIG. 12.
Figure 14:
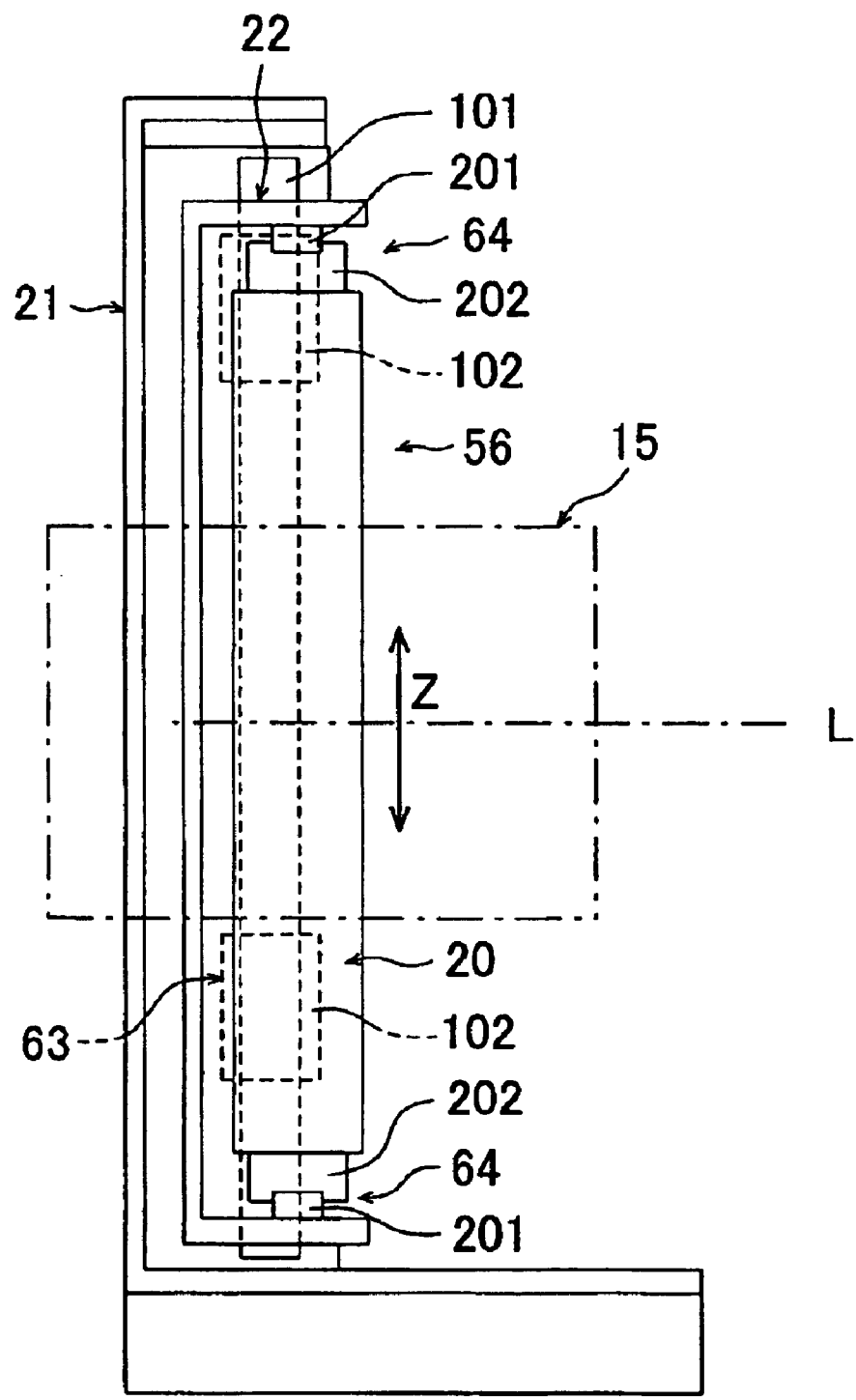
FIG. 14 is a sectional view taken along the line B2—B2 in FIG. 12.

FIGS. 12 through 14 show the structure of a lens barrel moving mechanism as the essential part of a liquid crystal projector, according to a second embodiment of the present invention. In the drawings, a numeral 56 designates the lens barrel moving mechanism.

The lens barrel moving mechanism 56 of this embodiment can be installed to the liquid crystal projector shown in FIG. 2, in place of the lens barrel moving mechanism 16 described hereinbefore. The lens barrel moving mechanism 56 is similarly structured as the aforementioned lens barrel moving mechanism 16 except those parts described in the following. As the same components as those of the aforementioned embodiment are marked with the same numerals, detail description about the components will be omitted.

FIG. 12 is a front view of the lens barrel moving mechanism 56, FIG. 13 is a sectional view taken along the line A2—A2 in FIG. 12, and FIG. 14 is a sectional view taken along the line B2—B2 in FIG. 12. As shown in the drawings, the lens barrel moving mechanism 56 is provided with a lens retaining member guiding mechanism which can move a lens retaining member 20 in the vertical direction (the direction of Z axis) and in the horizontal direction (the direction of X axis).

This lens retaining member guiding mechanism comprises first guiding mechanisms 63, 63 arranged between a fixed supporting member 21 and an intermediate member 22, and second guiding mechanisms 64, 64 arranged between the intermediate member 22 and the lens retaining member 20. Both guiding mechanisms will be described later in detail.

Figure 15:
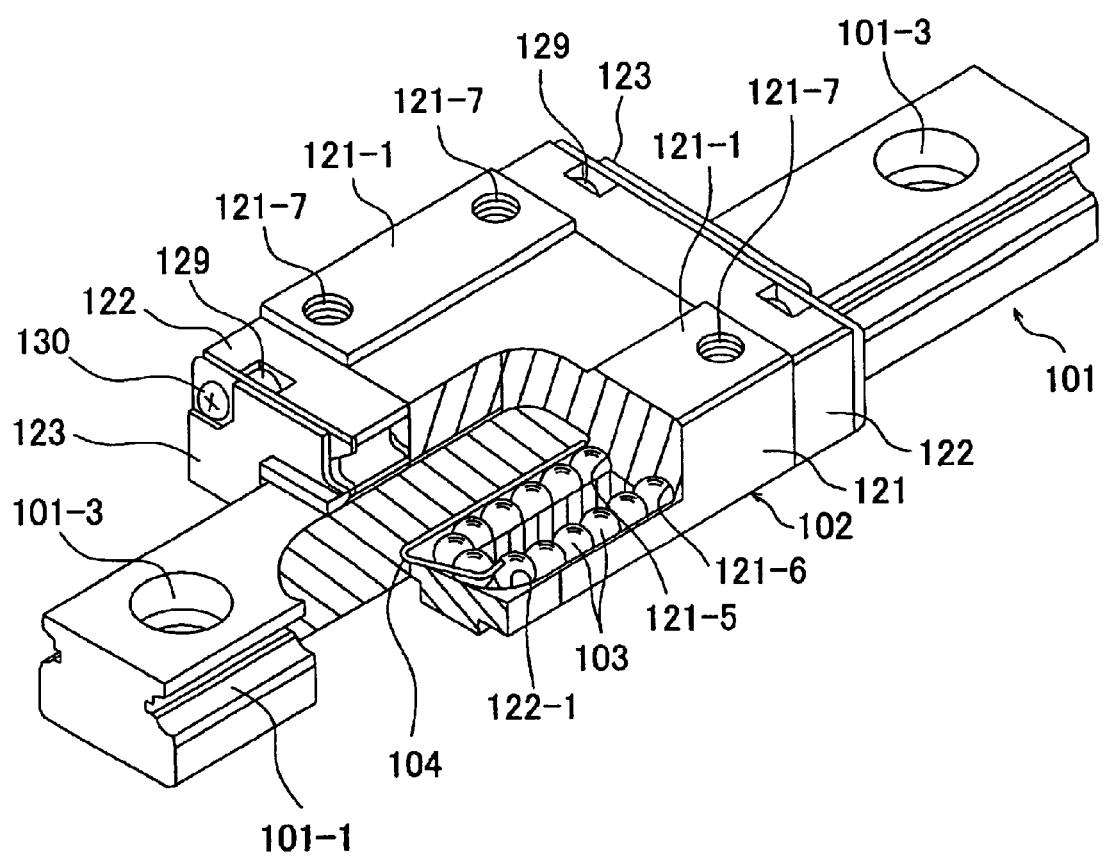
FIG. 15 is a partially cutaway perspective view of main parts of a first guiding mechanism.
Figure 16:
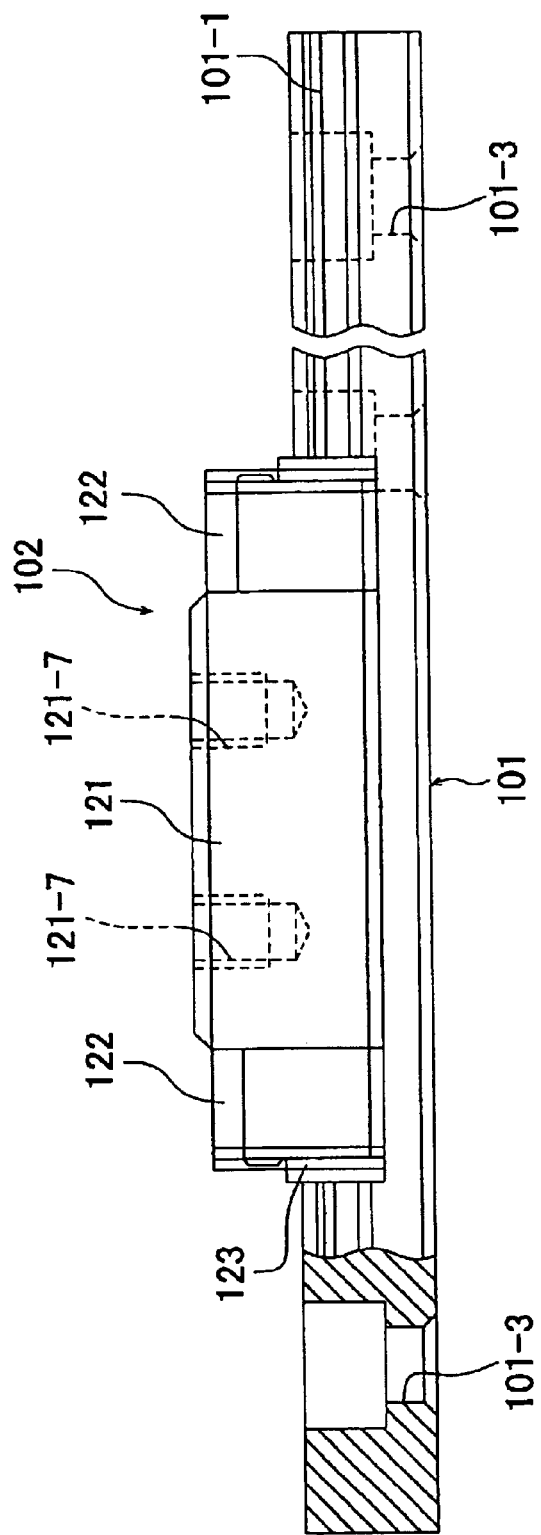
FIG. 16 is a partially cutaway side view of the first guiding mechanism of FIG. 15.
Figure 17:
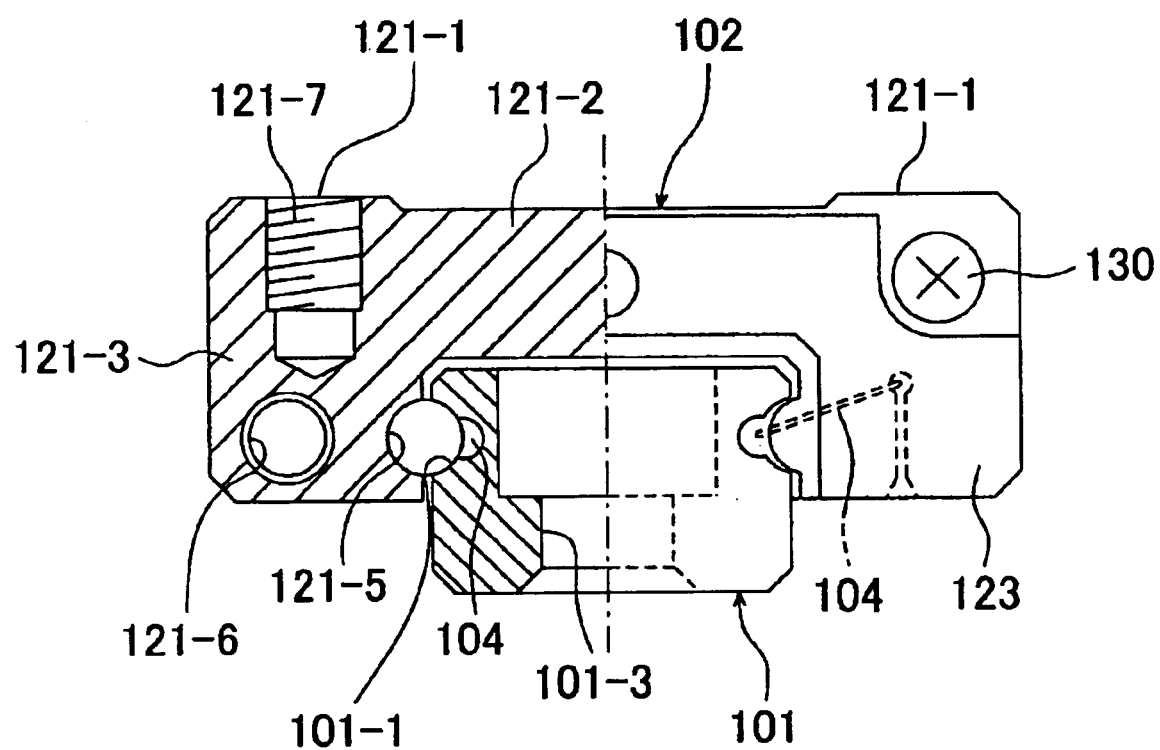
FIG. 17 is a partially cutaway front view of the first guiding mechanism of FIG. 15.

FIGS. 15 through 17 show the structure of main parts of one of the first guiding mechanisms 63, in which FIG. 15 is partially cutaway perspective view thereof, FIG. 16 is partially cutaway side view thereof, and FIG. 17 is partially cutaway front view thereof.

As shown in the drawings, the first guiding mechanism 63 comprises a track rail 101 as a track member, a movable block 102 as a movable member which is fitted to the track rail 101 in such a manner that the movable block 102 is slidable relative to the track rail 101, and balls 103 as multiple rolling members accommodated to be aligned in an endless circulation passage formed in the movable block 102. The balls 103 roll under load between the track rail 101 and the movable block 102.

In this case, two movable blocks 102 are employed for one track rail 101.

In addition, the movable block 102 is provided with a retainer 104 for preventing the balls 103 from dropping out from the movable block 102 when the movable block 102 is removed from the track rail 101.

The track rail 101 is substantially formed in a rectangular shape in a section perpendicular to the longitudinal direction and is provided on both lateral sides with rolling member running surfaces 101-1 extending along the longitudinal direction.

In this case, one rolling member running surface 101-1 for each lateral side, that is, two of them in total are formed. The number and arrangement of the rolling member running surfaces 101-1 can be varied, if necessary.

In the drawings, a numeral 101-3 designates each bolt hole through which a bolt (not shown) is inserted to secure the track rail 101. Bolt holes 101-3 are formed along the longitudinal direction of the track rail 101 with predetermined intervals.

Meanwhile, the movable block 102 is substantially formed in a U-shape in a section perpendicular to the moving direction in such a manner that the movable block 102 is arranged to sit astride the track rail 101. The movable block 102 comprises a block body 121, a pair of end caps 122 fixed on both end faces in the moving direction of the block body 121, and end seals 123 attached to the end caps 122 by means of screws 130 for sealing the gap between the movable block 102 and the track rail 101 from the outside.

As is seen from FIG. 17, the block body 121 comprises a horizontal part 121-2 having mounting surfaces 121-1, a pair of arms 121-3, 121-3 extending downwardly from both end portions of the horizontal part 121-2, and rolling member running surfaces 121-5 which are formed in the inner walls of the respective arms 121-3 to correspond to the rolling member running surfaces 101-1 of the track rail 101, respectively.

In addition, each arm 121-3 has a rolling member returning passage 121-6 formed therein to extend parallel to the rolling member running surface 121-5.

The rolling member running surface 121-5 and the rolling member returning passage 121-6 are also shown in FIG. 15.

In addition, the horizontal part 121-2 is provided with tapped holes 121-7 into which bolts (not shown) are screwed for securing the block body 121.

As shown in FIG. 15, each end cap 122 is provided with a turning passage 122-1 for balls 103 formed therein.

When each end cap 122 is attached to each end of the block body 121 by means of a bolt 129, the rolling member running surface 121-5 and the rolling member returning passage 121-6 in the block body 121-5 are connected to allow the communication therebetween by the turning passage 122-1, thus forming the endless circulation passage.

As described above, the balls 103 are accommodated to be aligned in the endless circulation passage and circulate according to the relative movement of the track rail 101 to the movable block 102.

The balls roll under load between the rolling member running surface 101-1 of the track rail 101 and the rolling member running surface 121-5 of the movable block 102.

The second guiding mechanism 64 also has a similar structure as the first guiding mechanism 63 and comprises a track rail 201 and a movable block 202 having the same structures as those of the track rail 101 and the movable block 102. Detailed drawing and description about the second guiding mechanism 64 will be omitted.

As shown in FIG. 13, the track rails 101 of the first guiding mechanisms 63, 63 are fixed to the both inner sides, in the horizontal direction (the direction of X axis), of the fixed supporting member 21, and the movable blocks 102 are fixed to the both ends, in the horizontal direction, of the intermediate member 22.

Also, as shown in FIG. 14, the track rails 201 of the second guiding mechanisms 64, 64 are fixed to the both inner sides, in the vertical direction (the direction of Z axis), of the intermediate member 22, and the movable blocks 202 are fixed to the both outer sides, in the vertical direction, of the lens retaining member 20.

In this embodiment, the driving force from the driving mechanism is applied not to the movable blocks 102, 102 but to the lens retaining member 20 or the intermediate member 22.

By applying driving force to the intermediate member 22 in the vertical direction, the lens retaining member 20 is moved in the vertical direction, that is, the lens barrel 15 is moved in the vertical direction. By applying driving force to the lens retaining member 20 in the horizontal direction, the lens retaining member 20 is moved in the horizontal direction, that is, the lens barrel 15 is moved in the horizontal direction.

As described above, the lens retaining member guiding mechanism comprises the first guiding mechanisms 63, 63 provided with the track rails 101 and the movable blocks 102 for guiding the lens retaining member 20 in the vertical direction, and the second guiding mechanisms 64, 64 provided with the track rails 201 and the movable blocks 202 for guiding the lens retaining member 20 in the horizontal direction, and is structured such that the balls 103 circulate in the endless circulation passage according to the relative movement of the movable blocks 102, 202 to the track rails 101, 201, thereby making the operation, that is, the relative movement of the movable blocks 102, 202 to the track rails 101, 201 extremely smooth. As a result, the lens barrel 15 can be moved more smoothly.

Further, the lens retaining member guiding mechanism composed of the track rails 101, 201 and the movable blocks 102, 202 has high rigidity ensuring a rigid support and a precise movement of the lens barrel 15.

Further in this case, the track rails 101, 201 and the movable blocks 102, 202 of the first guiding mechanisms 63, 63 and the second guiding mechanisms 64, 64 are arranged at substantially the same position relative to the direction of the optical axis L.

Therefore, the lens barrel moving mechanism 56 can be structured with a reduced thickness in the direction of the optical axis L, achieving the miniaturization.

Further, the track rails 101, 201 and the movable blocks 102, 202 of the first guiding mechanisms 63, 63 and the second guiding mechanisms 64, 64 are arranged in such a manner that their transverse directions are substantially parallel to the direction of the optical axis L.

This structure increases the rigidity against the moment in the direction perpendicular to the optical axis L. Thus, the heavy lens barrel 15 can be supported with high rigidity, thereby ensuring a precise and smooth movement of the lens barrel 15.

Further, an interference (minus clearance) is set between the balls 103 and the rolling member running surfaces of the track rail 101 and the movable block 102 of the first guiding mechanism 63, and between the balls 103 and the rolling member running surfaces of the track rail 201 and the movable block 202 of the second guiding mechanism 64.

This structure increases the rigidity of the first guiding mechanism 63 and the second guiding mechanism 64, thereby ensuring a more precise and smooth movement of the heavy lens barrel 15.

In addition, in the example described above, the track rails 101, 201 are fixed parts and the movable blocks 102, 202 are movable parts in the first and the second guiding mechanisms 63, 64. However, movable blocks 102, 202 may be fixed parts and the track rails 101, 201 may be movable parts.

EFFECT OF THE INVENTION

As discussed in the above, the following excellent effects can be obtained in accordance with the present invention.

In accordance with the first invention of the present application, a lens retaining member guiding mechanism comprises: a track member which is provided with a rolling member running surface extending along the longitudinal direction thereof; a movable member which is incorporated in the track member such that the movable member is movable relative to the track member and is provided with a rolling member running surface corresponding to the rolling member running surface of the track member; and a plurality of rolling members arranged between the rolling member running surface of the track member and the rolling member running surface of the movable member, thereby providing a lens moving mechanism having a simple structure and a reduced size and capable of achieving the smooth movement of a lens barrel provided therein with the projection lens.

In accordance with the second invention of the present application, the respective track members and the respective movable members of the first guiding means and the second guiding means are arranged at substantially the same position relative to the direction of the optical axis, thereby reducing the thickness of the lens moving mechanism in the direction of the optical axis and thus providing more compact lens moving mechanism.

In accordance with the third invention of the present application, the track members and the movable members of the lens retaining member guiding means are arranged in such a manner that their transverse directions are substantially parallel to the direction of the optical axis, thereby increasing the rigidity against the moment in the direction perpendicular to the optical axis and thus providing a lens moving mechanism which can support the heavy lens barrel with high rigidity and achieving the precise and smooth movement of the lens barrel.

In accordance with the fourth invention of the present invention, the rigidity of the lens retaining member guiding means is increased by setting an interference between the rolling members and the rolling member running surfaces of the track member and the movable member, thereby providing a lens moving mechanism which can smoothly move the heavy lens barrel with further high precision.

In accordance with the fifth invention of the present application, the track member and the movable member are an outer rail and an inner rail made of plate members. Therefore, since the track member and the movable member can be formed easily by, for instance, pressing of steel sheets and inexpensive commercially available balls can be used for the rolling members, the mechanism can be fabricated at relatively low cost, achieving the cost reduction.

In accordance with the sixth invention of the present application, the track member is a track rail provided with the rolling member running surfaces on both sides in the transverse direction thereof, and the movable member is a movable block provided with endless circulation passages including the rolling member running surfaces corresponding to the rolling member running surfaces of the track rail, and the rolling members are accommodated to be aligned in the endless circulation passages to circulate according to the relative movement of the movable block to the track rail. By this structure, an extremely smooth operation, that is, an extremely smooth relative movement of the movable block to the track rail can be achieved. Therefore, it is possible to provide a lens moving mechanism capable of achieving a smooth movement of the lens barrel.

Further, the lens retaining member guiding means composed of the track rail and the movable block has a high rigidity, thereby providing a lens moving mechanism capable of supporting the lens barrel rigidly and of moving the lens barrel with higher precision.

In accordance with the seventh invention of the present application, a liquid crystal projector comprises the lens moving mechanism as claimed in any one of claims 1 through 6, thereby providing a compact liquid crystal projector without generation of the image distortion and the chromatic aberration distortion in the projected image.

What we claim is:

1. A lens moving mechanism comprising: a lens retaining member for retaining a lens barrel which is provided therein with a projection lens for projecting light with image information; a lens retaining member guiding means for guiding said lens retaining member movably in at least one direction of an axis which is perpendicular to the optical axis of said light; a fixed supporting member for supporting said lens retaining member guiding means; and a driving means for applying a driving force to the lens barrel, wherein said lens retaining member guiding means comprises: a track member which is provided with a rolling member running surface extending along the longitudinal direction thereof; a movable member which is incorporated in said track member such that the movable member is movable relative to said track member and is provided with a rolling member running surface corresponding to the rolling member running surface of said track member; and a plurality of rolling members arranged between the rolling member running surface of said track member and the rolling member running surface of said movable member.

2. A lens moving mechanism as claimed in claim 1, further comprising an intermediate member for interconnecting said lens retaining member and said fixed supporting member, wherein said lens retaining member guiding means comprises a first guiding means arranged between said fixed supporting member and said intermediate member and a second guiding means arranged between said intermediate member and the lens retaining member, said first guiding means guides said intermediate member in a first predetermined direction, and said second guiding means guides said lens retaining member in a second predetermined direction perpendicular to said first predetermined direction, and the respective track members and the respective movable members of said first guiding means and said second guiding means are arranged at substantially the same position relative to the direction of the optical axis.

3. A lens moving mechanism as claimed in claim 1 or 2, wherein the track members and the movable members of said lens retaining member guiding means are arranged in such a manner that their transverse directions are substantially parallel to the direction of the optical axis.

4. A lens moving mechanism as claimed in claim 1 or 2, wherein an interference is set between the rolling members and the rolling member running surfaces of the track member and between the rolling members and the rolling member running surfaces of the movable member in said lens retaining member guiding means.

5. A lens moving mechanism as claimed in claim 1 or 2, wherein said track member is an outer rail which is made of a plate member and substantially formed in a U-shape in a section perpendicular to the longitudinal direction thereof and to have the rolling member running surfaces on both inner sides in the transverse direction thereof, and said movable member is an inner rail which is made of a plate member and substantially formed in a U-shape in a section perpendicular to the longitudinal direction thereof and to have the rolling member running surfaces on both outer sides in the transverse direction thereof, and said lens moving mechanism further comprising a rolling member retainer which retains rotatably said rolling members.

6. A lens moving mechanism as claimed in claim 1 or 2, wherein said track member is a track rail provided with the rolling member running surfaces on both sides in the transverse direction thereof, and said movable member is a movable block provided with endless circulation passages including the rolling member running surfaces corresponding to the rolling member running surfaces of said track rail, and said rolling members are accommodated to be aligned in said endless circulation passages to circulate according to the relative movement of said movable block to said track rail.

7. A liquid crystal projector comprising: a lens moving mechanism as claimed in claim 1 or 2; and a projector casing which is provided therein with liquid crystal panels, wherein lights with image information from said liquid crystal panels are introduced to the projection lens retained by said lens moving mechanism.

* * * * *